(12) United States Patent
Koukoumidis et al.

(10) Patent No.: US 10,860,587 B2
(45) Date of Patent: Dec. 8, 2020

(54) CONVERSATIONALLY-RELEVANT CONTENT REQUESTS

(71) Applicant: Microsoft Technology Licensing, LLC, Redmond, WA (US)

(72) Inventors: Emmanouil Koukoumidis, Kirkland, WA (US); Joseph Edwin Johnson, Jr., Seattle, WA (US); Dustin Isaac Abramson, Bellevue, WA (US); Steven Gary Zittrower, Mercer Island, WA (US); Di Li, Beijing (CN); Ying Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 15/622,590

(22) Filed: Jun. 14, 2017

(65) Prior Publication Data

US 2018/0365296 A1    Dec. 20, 2018

(51) Int. Cl.
| | |
|---|---|
| *G06F 16/2457* | (2019.01) |
| *G06F 16/242* | (2019.01) |
| *G06F 16/332* | (2019.01) |
| *G06F 16/387* | (2019.01) |
| *H04L 12/58* | (2006.01) |
| *G06F 40/242* | (2020.01) |
| *G06F 40/295* | (2020.01) |

(52) U.S. Cl.
CPC ...... *G06F 16/24575* (2019.01); *G06F 16/243* (2019.01); *G06F 16/3329* (2019.01); *G06F 16/387* (2019.01); *H04L 51/02* (2013.01); *H04L 51/04* (2013.01); *G06F 40/242* (2020.01); *G06F 40/295* (2020.01)

(58) Field of Classification Search
CPC ............. G06F 16/24575; G06F 16/243; G06F 16/3329; G06F 16/387; G06F 40/242; G06F 40/295; H04L 51/04; H04L 51/02
See application file for complete search history.

(56) References Cited

U.S. PATENT DOCUMENTS

| | | | |
|---|---|---|---|
| 7,814,048 B2 | 10/2010 | Zhou et al. | |
| 8,185,380 B2 | 5/2012 | Kameyama | |
| 8,738,739 B2 | 5/2014 | Makar et al. | |
| 9,355,361 B2 | 5/2016 | Pinckney et al. | |
| 2006/0259473 A1 | 11/2006 | Li et al. | |
| 2010/0235235 A1 | 9/2010 | Hosseini et al. | |

(Continued)

OTHER PUBLICATIONS

"Concierge Eventbot", https://conciergeeventbot.com/, Retrieved on: Jan. 19, 2017, 19 pages.
Dewey, Caitlin, "Meet Tay, The Creepy-Realistic Chatbot Who Talks Like a Teenager", http://www.smh.com.au/technology/innovation/meet-tay-the-creepyrealistic-chatbot-who-talks-like-a-teenager-20160324-gnq8br.html, Published on: Mar. 24, 2016, 3 pages.

(Continued)

*Primary Examiner* — Hau H Hoang
(74) *Attorney, Agent, or Firm* — Schwegman Lundberg & Woessner, P.A.

(57) ABSTRACT

Systems and methods are disclosed for conversationally-relevant content requests. In one implementation, a first communication is processed to identify a first content element within the communication. The first content element is stored within a first content repository. A content request is generated based on the first content repository. The content request is provided to the user. A second communication is received from the user in response to the content request. An action is initiated based on the second communication.

20 Claims, 9 Drawing Sheets

(56) References Cited

U.S. PATENT DOCUMENTS

| | | | |
|---|---|---|---|
| 2014/0122056 A1 | 5/2014 | Duan | |
| 2014/0201629 A1* | 7/2014 | Heck | G06N 5/00 |
| | | | 715/708 |
| 2015/0178371 A1 | 6/2015 | Seth et al. | |
| 2016/0171387 A1 | 6/2016 | Suskind | |
| 2016/0300570 A1 | 10/2016 | Gustafson et al. | |
| 2017/0132199 A1* | 5/2017 | Vescovi | G06F 3/04842 |
| 2017/0277993 A1* | 9/2017 | Beaver | G06F 17/2785 |
| 2018/0052842 A1* | 2/2018 | Hewavitharana | G06F 16/951 |
| 2018/0096072 A1* | 4/2018 | He | G06F 3/0481 |

OTHER PUBLICATIONS

Yan, et al., "'Shall I Be Your Chat Companion?": Towards an Online Human-Computer Conversation System", In Proceedings of the 25th ACM International on Conference on Information and Knowledge Management, Oct. 24, 2016, pp. 649-658.

Vanian, Jonathan, "Microsoft Unveils Sarcastic Millennial Chat Bot Powered by Artificial Intelligence", http://fortune.com/2016/03/23/microsoft-sarcastic-millennial-chat-artificial-intelligence/, Published on: Mar. 24, 2016, 3 pages.

Negi, et al., "Automatically Extracting Dialog Models from Conversation Transcripts", In Proceedings of Ninth IEEE International Conference on Data Mining, Dec. 6, 2009, pp. 890-895.

Natalia, Konstantinova, "Knowledge Acquisition from User Reviews for Interactive Question Answering", In Dissertation of University of Wolverhampton, 2013, 4 pages.

* cited by examiner

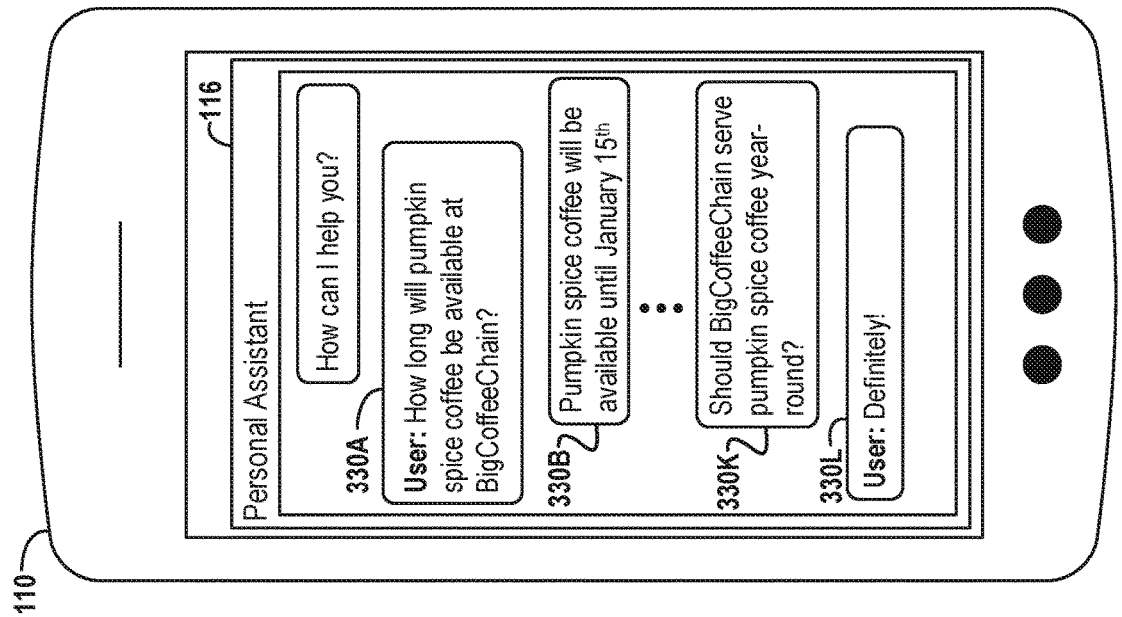

CONVERSATIONALLY-RELEVANT CONTENT REQUESTS

TECHNICAL FIELD

Aspects and implementations of the present disclosure relate to data processing and, more specifically, but without limitation, to conversationally-relevant content requests.

BACKGROUND

Personal digital assistants are applications or services that retrieve information or execute tasks on behalf of a user. Users can communicate with such personal digital assistants using conversational interfaces such as messaging or chat interfaces.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, Systems and methods are disclosed for conversationally-relevant content requests. In one implementation, a first communication is processed to identify a first content element within the communication. The first content element is stored within a first content repository. A content request is generated based on the first content repository. The content request is provided to the user. A second communication is received from the user in response to the content request. An action is initiated based on the second communication.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 3A-3F illustrate example scenarios described herein, according to an example embodiment.

DETAILED DESCRIPTION

Figure 1:
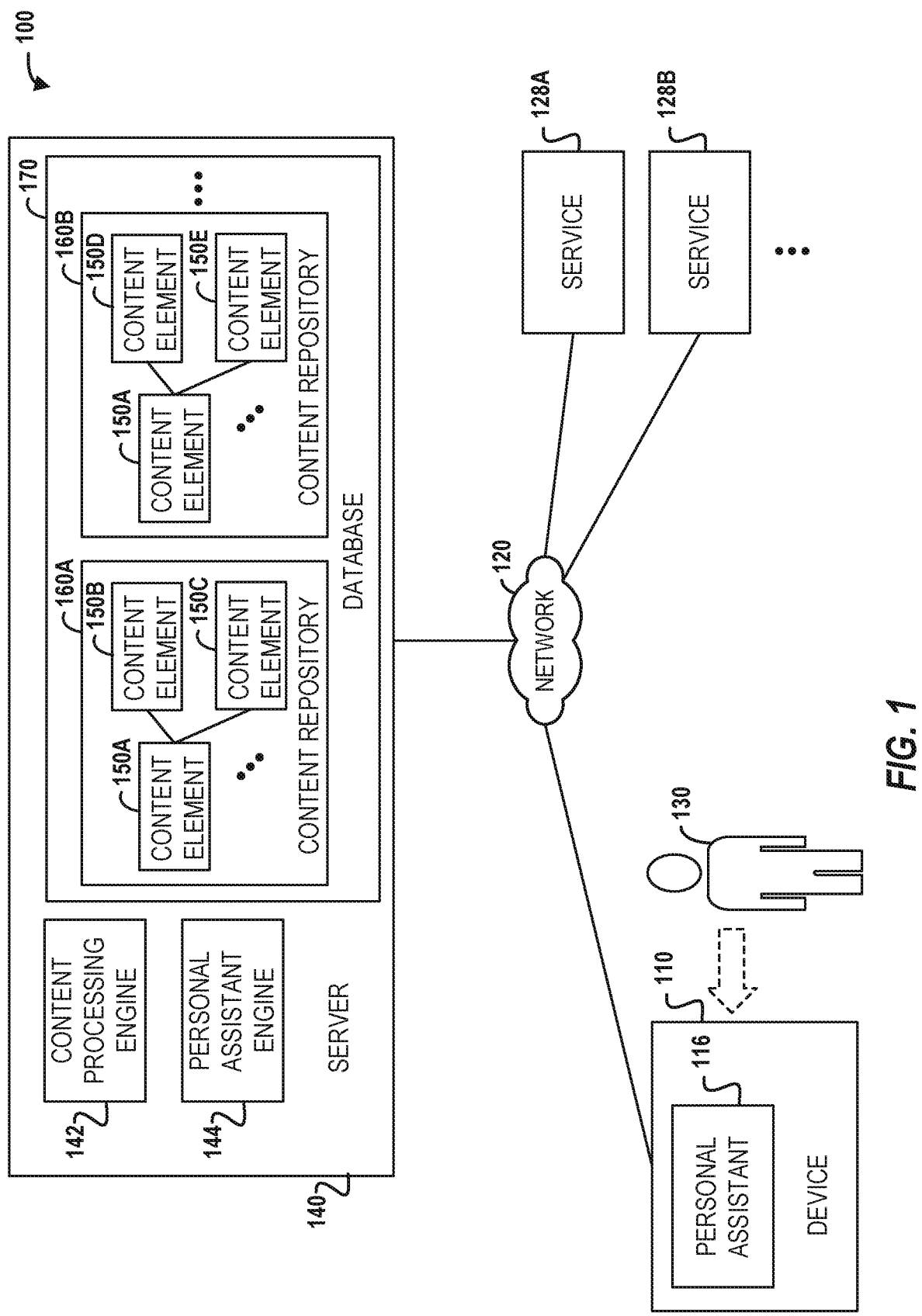
FIG. 1 illustrates an example system, in accordance with an example embodiment.

Aspects and implementations of the present disclosure are directed to conversationally-relevant content requests.

It can be appreciated that intelligent personal assistants and related technologies can enable a user to obtain information, execute tasks, and perform other activities. Users can interact with or control such personal assistants via conversational interfaces such as messaging, chat, audio commands etc. Though such conversational interfaces provide a framework for performing specific tasks, such technologies do not further leverage the conversational context reflected in a sequence of communications between a user and a personal assistant. For example, when providing information to a user, personal assistants are not configured to subsequently transition the conversation to another topic. Such personal assistants are also not configured to subsequently request information/feedback from the user which may be relevant to third parties.

Accordingly, described herein in various implementations are technologies, including methods, machine readable mediums, and systems, that enable conversationally-relevant content requests. For example, the described technologies can process communication(s) received from a user to identify content elements (e.g., entities, etc.) that are mentioned or referenced. Various content repositories can be utilized to identify related/associated content element(s), and such related elements can be incorporated into subsequent communications directed to the user. In doing so, communication sequences or conversations between the user and a personal assistant can proceed in a manner that is more natural and closer to the manner in which the user might communicate with another human user. Rather than simply repeating or referencing the same content element(s) initially mentioned by the user, the described technologies can incorporate other related/associated content element(s) into subsequent communication(s). In doing so, the user can be provided with a more natural/human-like conversational experience. Additionally, the described technologies can more naturally transition a conversation/series of communication(s) from one topic to another. In doing so, the user can be prompted to provide additional information which can be advantageous in any number of scenarios (e.g., to provide updated or missing information), as described herein.

It can therefore be appreciated that the described technologies are directed to and address specific technical challenges and longstanding deficiencies in multiple technical areas, including but not limited to communication interfaces, semantic relationships, and intelligent personal assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates an example system 100, in accordance with some implementations. As shown, the system 100 includes device 110 which can be a laptop computer, a desktop computer, a terminal, a mobile phone, a tablet computer, a smart watch, a wearable device, a personal digital assistant (PDA), a digital music player, a server, and the like. User 130 can be a human user who interacts with device 110. For example, user 130 can provide various inputs (e.g., via an input device/interface such as a keyboard, mouse, touchscreen, etc.) to device 110. Device 110 can also display, project, and/or otherwise provide content to user 130 (e.g., via output components such as a screen, speaker, etc.).

As shown in FIG. 1, device 110 can include personal assistant 116. Personal assistant 116 can be an application or module that configures/enables the device to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant 116 can also enable user 130 to initiate and/or configure other application(s). For example, user 130 can provide a command/communication to personal assistant 116 (e.g., 'play jazz music'). In response to such command, personal assistant 116 can initiate an application (e.g., a media player application) that fulfills the request provided by the user. Personal assistant can also initiate and/or perform various other operations, such as are described herein.

It should be noted that while various components (e.g., personal assistant 116) are depicted and/or described as operating on a device 110, this is only for the sake of clarity. However, in other implementations the referenced components can also be implemented on other devices/machines. For example, in lieu of executing locally at device 110, aspects of personal assistant 116 can be implemented remotely (e.g., on a server device or within a cloud service or framework). By way of illustration, personal assistant 116 can operate in conjunction with personal assistant engine 144 which can execute on a remote device (e.g., server 140, as described below). In doing so, personal assistant 116 can, for example, request or receive information, communications, etc., from personal assistant engine 144, thereby enhancing the functionality of personal assistant 116.

Figure 7:
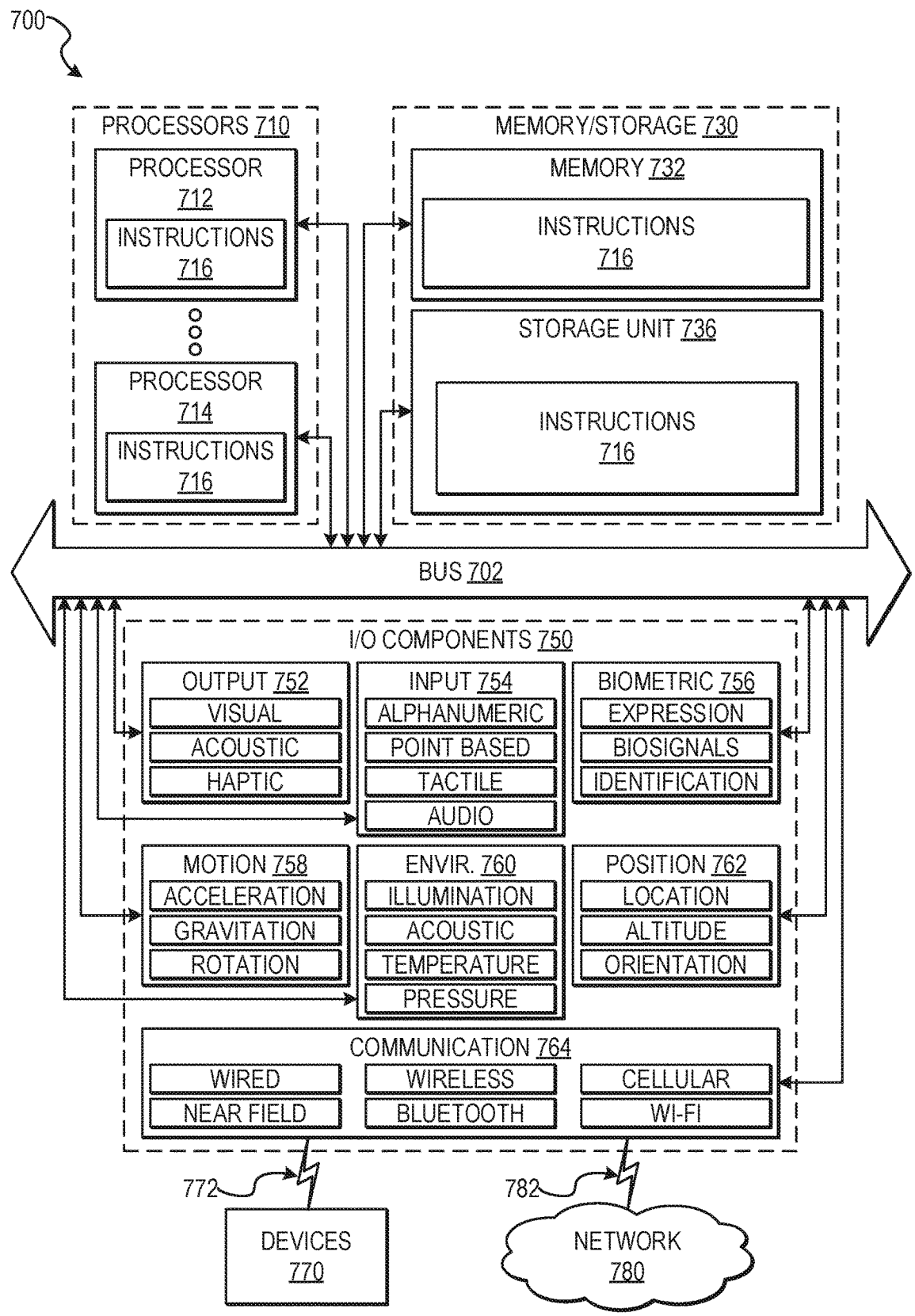
FIG. 7 is a block diagram illustrating components of a machine able to read instructions from a machine-readable medium and perform any of the methodologies discussed herein, according to an example embodiment.

The application(s) referenced above/herein (e.g., personal assistant 116) can be stored in memory of device 110 (e.g. memory 730 as depicted in FIG. 7 and described below). One or more processor(s) of device 110 (e.g., processors 710 as depicted in FIG. 7 and described below) can execute such application(s). In doing so, device 110 can be configured to perform various operations, present content to user 130, etc. Other examples of such applications include but are not limited to: social media/messaging applications, mobile 'apps,' etc.

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include content processing engine 142, personal assistant engine 144, and database 170.

Content processing engine 142 can be an application or module that configures/enables server 140 to perform various operations such as are described herein. For example, content processing engine 142 can configure or enable server 140 to create, maintain, access, and/or query database 170.

Database 170 can be a storage resource such as an object-oriented database, a relational database, etc. In certain implementations, various repositories such as content repository 160A and content repository 160B (collectively, content repositories 160) can be defined and stored within database 170. Each of the referenced content repositories 160 can be, for example, a knowledge base or conversational graph within which various content elements (e.g., content element 150A, content element 150B, etc.,—collectively content elements 150—as shown in FIG. 1) can be stored. Such content elements can be, for example, various intents, entities, and/or actions, such as can be identified or extracted from communications, conversations, and/or other inputs received from, provided to, and/or otherwise associated with user 130. It should be understood that content repository 160A pertains to and/or is otherwise associated with user 130. Accordingly, the referenced repository can content elements (e.g., entities, etc.) and related information with respect to which user 160A has previously communicated about, and reflect relationships and other associations between such elements. In contrast, content repository 160B can pertain to and/or otherwise be associated with another user or entity.

In certain implementations, content processing engine 142 can utilize an ontology, model, and/or schema to define and/or represent various aspects, features, attributes, etc. of the content elements 150, as well as relationships between respective content elements. By way of illustration, content processing engine 142 can receive various communications from device 110 (e.g., a text communication, request, etc. that the user provides to personal assistant 116). Content processing engine 142 can process such communication(s) (e.g., using natural language processing and/or other such techniques) to parse the communication(s) and identify/extract content element(s) (e.g., entities, intents, actions, etc.) present within the received communication(s). The extracted content elements can then be stored within content repository 160A in accordance with the referenced ontology, model, and/or schema.

Personal assistant engine 144 can be an application or module that configures/enables the device to interact with, provide content to, and/or otherwise perform operations on behalf of a user (e.g., user 130). For example, personal assistant engine 144 can receive communication(s) from user 130 and present/provide responses to such request(s) (e.g., within a conversational interface). In certain implementations, personal assistant engine 144 can also identify content that can be relevant to user 130 (e.g., based on a location of the user or other such context) and present such content to the user.

In various implementations, the described technologies may utilize, leverage and/or otherwise communicate with various services such as service 128A and service 128B (collectively services 128), as shown in FIG. 1. Such services can be, for example, third-party services that can enable the retrieval of content (e.g., business names, addresses, phone numbers, etc.) that may enhance or otherwise be relevant to certain operations described herein. In certain implementations, such received content/information can be stored within content repositories 160 (thereby further enhancing the content stored therein). Additionally, in certain implementations such services can be services that the user may communicate/interact with, etc. For example, service 128A can be a business directory service and service 128B can be a business rating service. User 130 can communicate with such service(s) via mobile application(s) running on device 110.

While many of the examples described herein are illustrated with respect to a single server 140, this is simply for the sake of clarity and brevity. However, it should be understood that the described technologies can also be implemented (in any number of configurations) across multiple servers and/or other computing devices/services.

Further aspects and features of server 140 and device 110 and are described in more detail in conjunction with FIGS. 2-7, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
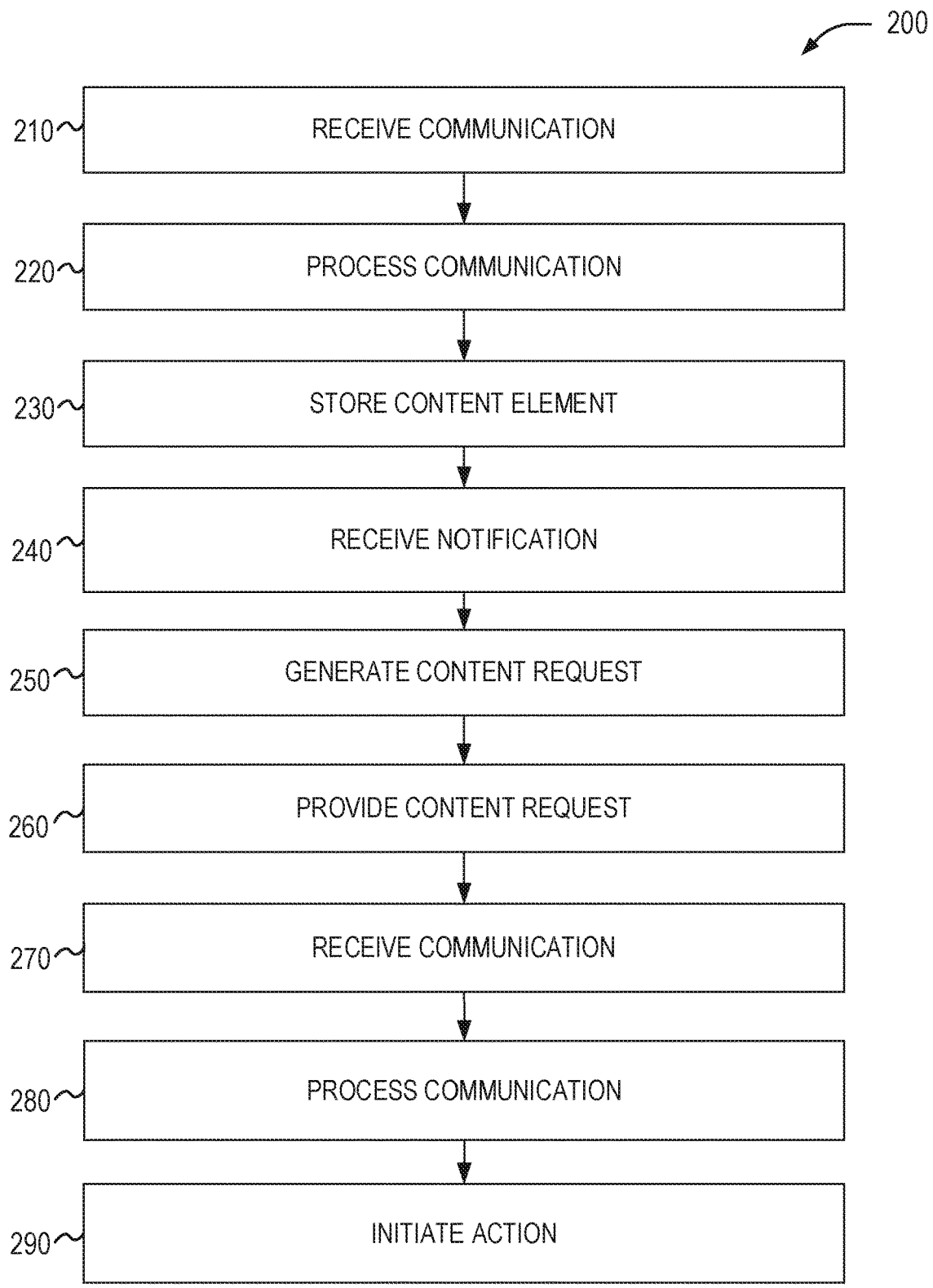
FIG. 2 is a flow chart illustrating a method, in accordance with an example embodiment, for conversationally-relevant content requests.

FIG. 2 is a flow chart illustrating a method 200, according to an example embodiment, for conversationally-relevant content requests. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1 (including but not limited to server 140 and/or content processing engine 142), while in some other implementations, the one or more blocks of FIG. 2 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 210, a communication is received. In certain implementations, such a communication (e.g., a first communication) can originate/be received from a user (e.g., user 130). Such a communication can be, for example, a message/transmission (e.g., as provided within a messaging/chat interface or any other such communication framework). For example, the referenced communication can be a text input, voice input, etc., provided by user 130 to device 110 via personal assistant 116. The communication can then be provided to (and received by) server 140. In certain implementations, various aspects of operation 205 (as well as the other operations described with respect to FIG. 2) are performed by server 140 and/or content processing engine 142 (e.g., as depicted in FIG. 1). In other implementations, such aspects can be performed by one or more other elements/components, such as those described herein.

Figure 3B:
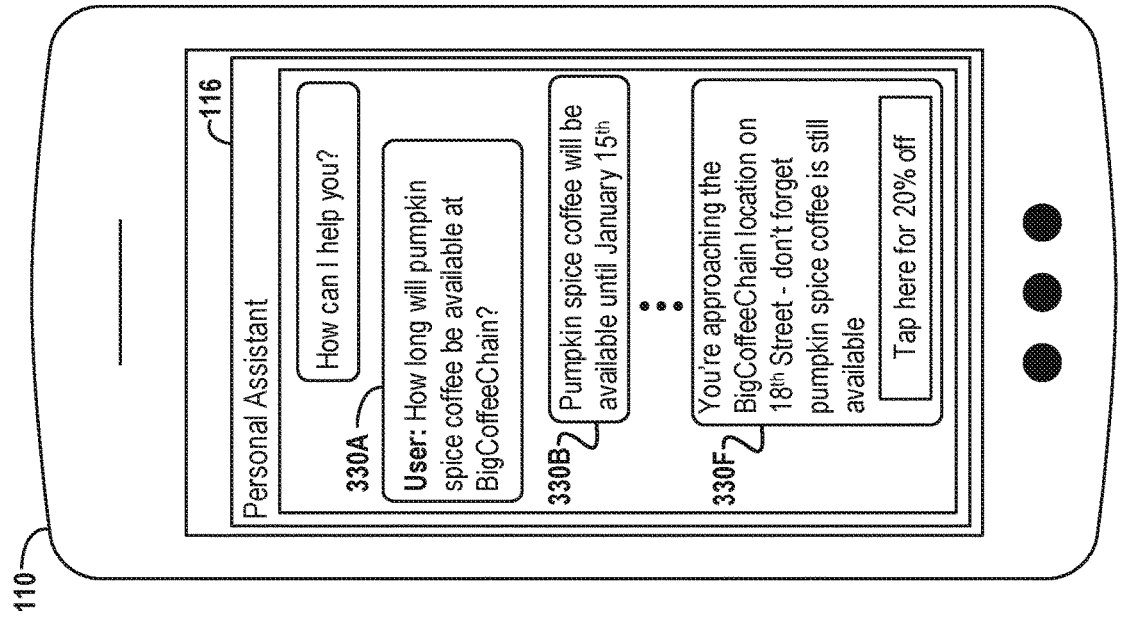
Figure 3A:
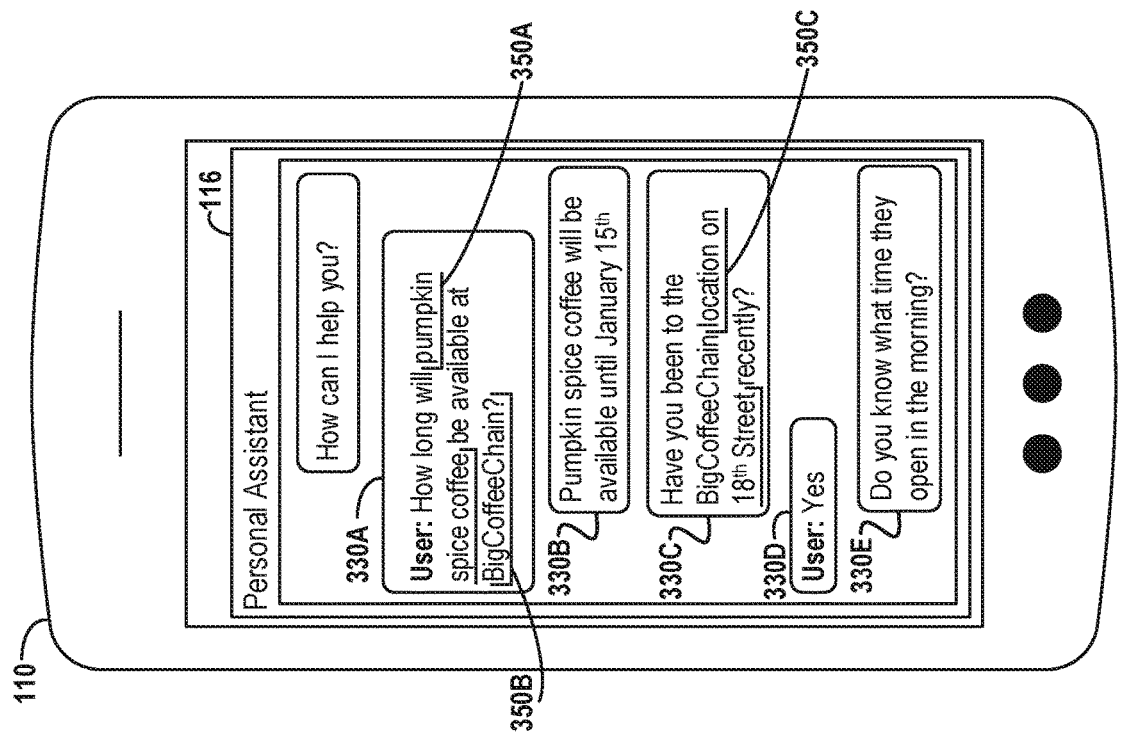

By way of illustration, FIG. 3A depicts an example scenario in which personal assistant 116 is executing on device 110. As shown in FIG. 3A, user 130 can provide/input communication/message 330A ("How long will . . . "). Such communication 330A can be transmitted to/received by server 140 and/or content processing engine 142 (e.g., in conjunction with the operation of personal assistant 116 and/or personal assistant engine 144).

Moreover, in certain implementations the referenced communication can be and/or include a context indicator. Such a context indicator can be content, information, etc. (e.g., metadata) that reflects various aspects of the context in which user 130 and/or device 110 is present. For example, such a context can be a geographic location (e.g., geographic coordinates) at which device 110 is currently present (e.g., as determined via a GPS receiver of the device). In certain implementations, such a context indicator itself can be transmitted/received as the referenced communication (e.g., in a scenario in which server 140 is updated with a current location of device 110). In other implementations, such a context indicator can be included or incorporated as metadata together with another communication (e.g., metadata associated with communication 330A, reflecting the location from which the text communication was sent).

At operation 220, the communication (e.g., the communication received at operation 210) is processed. In doing so, a content element (or multiple content elements) can be identified. Such content element(s) can be identified within or otherwise extracted from the referenced communication. In certain implementations, such a content element can include but it not limited to an intent, an entity, or an or an action (and/or parameters/values of such elements). For example, in the scenario depicted in FIG. 3A, communication 330A can be processed (e.g., by content processing engine 142) to identify/extract content element(s) such as content element 350A (the entity "pumpkin spice coffee").

Moreover, in certain implementations a lexicon and/or vernacular associated with a user (e.g., the user from which the referenced communication was received) can also be identified. Such a lexicon or vernacular can reflect or include various content items, expressions, acronyms, etc., that are used with respect/in relation to one another. For example, in the scenario depicted in FIG. 5A, communication 530A ("What's the fastest . . . ") can be processed to identify content element 550A (the entity "Yankee Stadium"). Having identified such a content element (here, 'Yankee Stadium'), various other related content elements can also be identified (e.g., those stored within database 170 and associated with content element 550A, as described herein). Such related/associated content elements can reflect a lexicon, vernacular, etc., associated with user(s) that discuss and/or are otherwise determined to be interested in 'Yankee Stadium.'

Figure 5B:
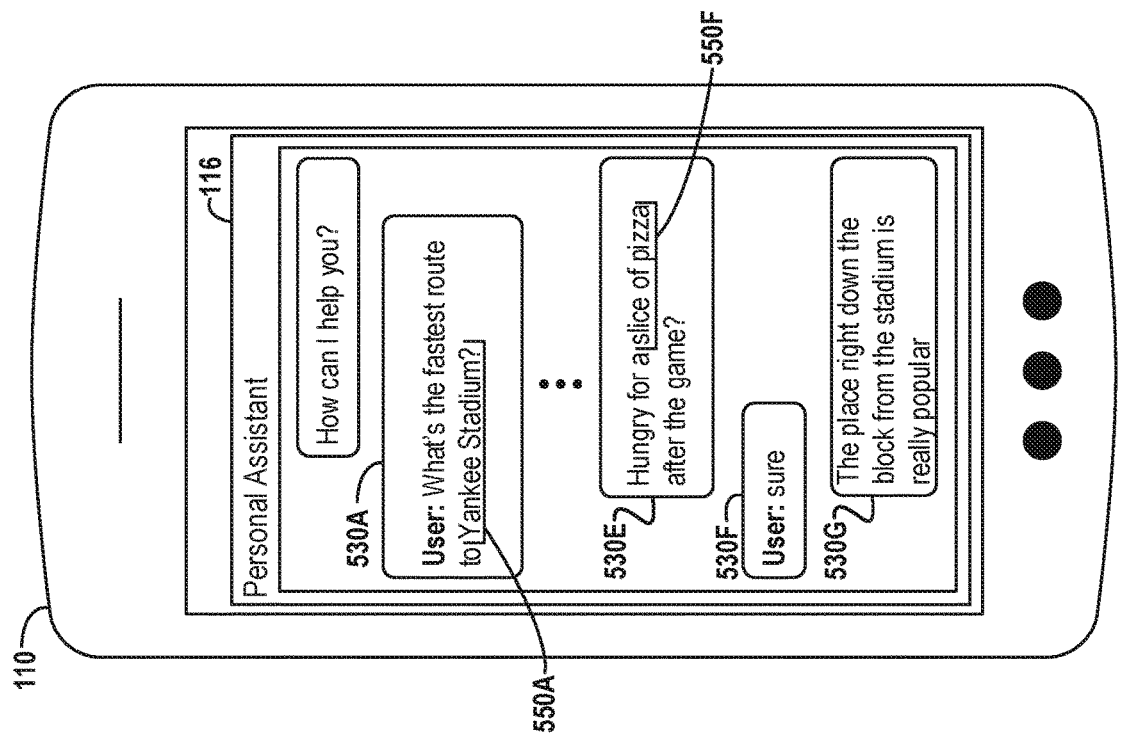
FIGS. 5A and 5B illustrate example scenarios described herein, according to an example embodiment.
Figure 5A:
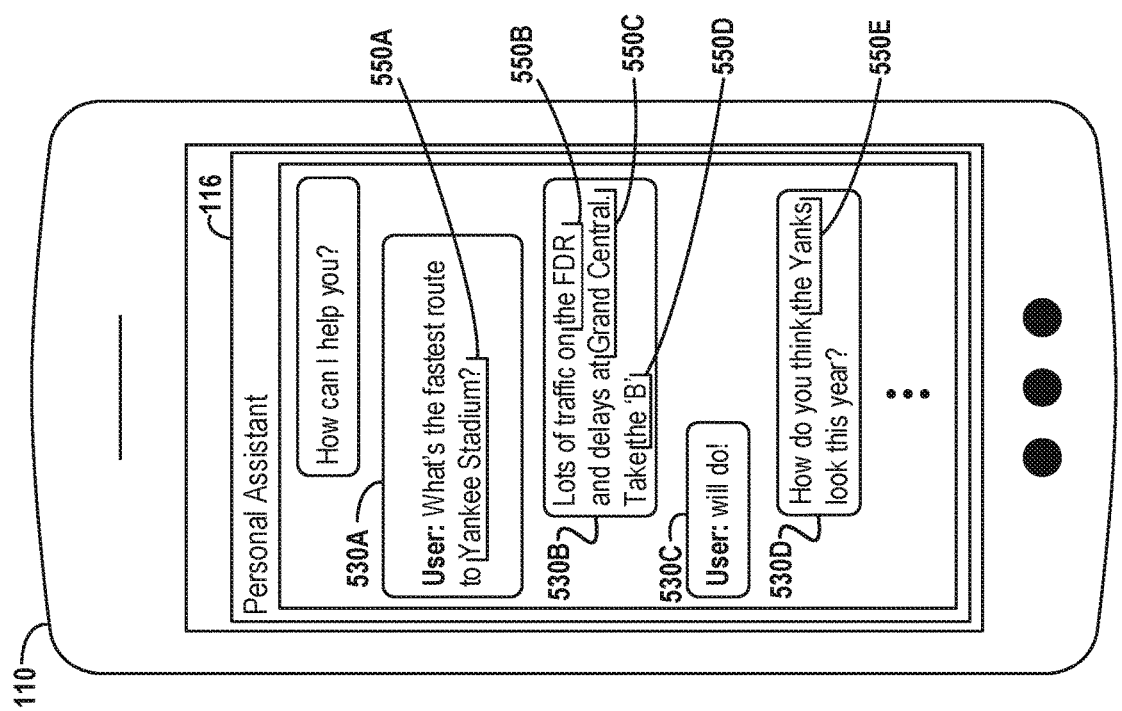

For example, as shown in FIG. 5A, content element 550B ("the FDR"), content element 550C ("Grand Central"), content element 550D ("the 'B'"), and content element 550E ("the Yanks") can be part of a lexicon of user(s) who discuss content element 550A ("Yankee Stadium"). Accordingly, as described in detail herein, having identified a lexicon, vernacular, etc., associated with a user (and/or an entity mentioned or referenced by the user), other content elements included in such a lexicon/vernacular can also be included/incorporated within subsequent communications directed to the referenced user. For example, having identified a lexicon associated with a user (e.g., based on content element 550A within communication 530A from user 130), subsequent communication(s) generated/provided to such user (e.g., communications 530B and 530D) can incorporate other content elements from the identified lexicon (e.g., content elements 550B, 550C, and 550D). In doing so, personal assistant engine 144 can generate and provide communications to a user that reference content elements, terminology, expressions, etc. that are likely to be familiar to the user.

At operation 230, a content element (e.g., the content element identified at operation 220) is stored. In certain implementations, such a content element is stored within a content repository (e.g., content repository 160A within database 170). Such a content repository can be, for example, a knowledge base or graph that contains content element(s) that pertain to a particular user (e.g., user 130). Moreover, in certain implementations the identified content element can be associated with other content element(s) stored within the referenced content repository 160A. The associating of the referenced content elements can be performed, for example, based on/in conjunction with an ontology, schema, or model that defines relationships, associations, etc. between elements within the content repository.

By way of illustration, as shown in FIG. 3A, in addition to content element 350A ('pumpkin spice coffee'), communication 330A (as received from user 130) can also include content element 350B ('BigCoffeeChain'). Accordingly, having identified content element 350B (e.g., within the same communication 330A as content element 350A), such content elements can be associated with one another (e.g., within content repository 160A, which pertains to user 130). Such an association (e.g., between content element 350A and content element 350B) can reflect a relationship between such content elements. In doing so, subsequent communication(s) can be generated/initiated based on such association(s)/relationship(s), as described herein.

It should also be noted that, in certain implementations, the referenced association(s) between content elements (as reflected in content repository 160A) can be identified, determined, etc., based on external sources, content, etc. For example, in certain implementations an external service 128A (e.g., a content search service) can be used to identify/retrieve other content elements that are associated with a content element mentioned/referenced within a communication. Having received such related content element(s) (e.g., from service 128A), such related content element(s) can be stored within content repository 160A (e.g., in association with the content element mentioned/referenced by the user).

At operation 240, a notification is received, e.g., from a service. Such a service can be an external or third-party service, such as service 128A as shown in FIG. 1. In certain implementations, such a notification can be a content deficiency notification. Such a content deficiency notification can reflect an absence of data, information, etc. (and/or the absence of accurate and/or up-to-date information), e.g., in a database stored/maintained by service 128A.

For example, service 128A can be an external or third-party service (e.g., a directory) that maintains information associated with various businesses (e.g., contact information, operating hours, etc.). In certain scenarios, the referenced service can detect or otherwise identify a content deficiency. For example, the referenced service can determine that certain information is missing within a database (e.g., a street address, phone number, etc., of a particular establishment). By way of further illustration, the referenced service can determine that certain information (e.g., a street address, phone number, etc., of a particular establishment) may not be current. Having identified such a content deficiency, the referenced service can generate a corresponding notification which can be provided to/received by server 140. Such a content deficiency notification can reflect the referenced content (e.g., address, phone number, etc.) that is missing, not up-to-date, etc.

At operation 250, a content request is generated. Such a content request can be a communication (e.g., a message) that includes a request for information or otherwise prompts a user to provide such information. In certain implementations, such a request can be directed to a user (e.g., user 130), e.g., as a communication provided within a messaging/conversational interface (e.g., by personal assistant 116). In certain implementations, the referenced content request can be generated based on a content deficiency notification (e.g., as received at operation 240, such as from a third-party service 128A). In other implementations, such a content request can be generated based on a content repository (e.g., the content repository within which an element was stored at operation 230).

For example, a content deficiency can be identified within a content repository (e.g., content repository 160A). As noted above, such a content repository can be a knowledge base or graph containing content element(s) that pertain to a particular user (e.g., user 130), as well as associations, relationships, etc., between such content elements. For example, as described above, content repository 160A can include a content element corresponding to a particular business, location, etc., though certain information pertaining to such a content element (e.g., the operating hours of the business) may not be included in the content repository. Accordingly, upon identifying such a content deficiency (e.g., the absence of such content, information, etc., within the content repository), a content request can be generated. Such a content request can be a request (which can be directed to various users, such as user 130) that prompts the user to provide such missing content, information, etc.

By way of illustration, within the discussion/series of communications between user 130 and personal assistant 116 as shown in FIG. 3A, various content elements can be mentioned, referenced, etc. (e.g., content element 350B—'BigCoffeeChain' and/or content element 350C—the 'location on 18$^{th}$ Street'). As noted above, such content elements can be stored in a content repository 160A with respect to the user 130. Accordingly, upon identifying a content deficiency within the content repository, e.g., with respect to certain subject matter, a topic, etc., (e.g., operating hours of a business), a content request can be generated. As described in detail below, such a content request can include or reflect a prompt that requests the user to provide the information that is not included (or is not up-to-date) within the content repository. For example, as shown in FIG. 3A, communication 330E ("Do you know . . . ") can be generated and provided to user 130. Such a communication can reflect or incorporate a request to the user to provide the referenced information (here, the time that the referenced location opens in the morning). Upon receiving such information (e.g., a reply from user 130 indicating the opening time of the referenced establishment) the referenced content deficiency can be updated accordingly.

Figure 3F:
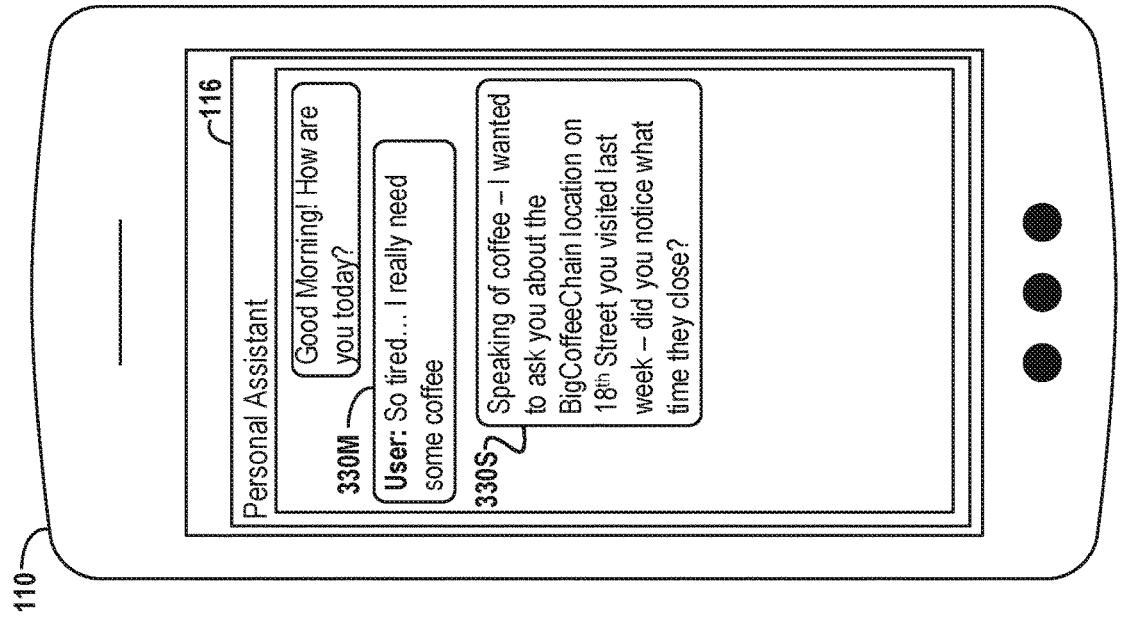

By way of further illustration, FIG. 3F depicts an example scenario that reflects a conversation occurring after user 130 has visited the referenced 'BigCoffeeChain' location on 18$^{th}$ Street (e.g., a few days or weeks later). As shown in FIG. 3F, after user 130 mentions 'coffee' (in communication 330M), communication 330S ("Speaking of . . . ") can be generated/provided which requests information (e.g., opening/closing times) pertaining to the referenced establishment. In doing so, prior conversation(s) and/or other such determinations/information (e.g., a prior conversation referencing 'BigCoffeeChain' on 18$^{th}$ Street, such as is shown in FIG. 3B) can be used to trigger or initiate content request(s)/communications in other communication sessions (e.g., as shown in FIG. 3F).

It should also be noted that in certain scenarios the described technologies can be configured to generate/provide a series or sequence of communications/content request(s) in order to transition a topic of conversation towards the referenced content deficiency. Such a sequence can, for example, begin with a general question directed to the user (e.g., 'Any plans tonight?') and be followed by subsequent request(s) based on responses received from the user (e.g., 'Want to try a new restaurant?' 'Do you like Italian food?' 'Ever been to TheItalianRestaurant?' 'How was it?').

It should be understood that the scenarios described herein are provided by way of example and that any number of other content request(s) can also be generated. For example, a content request can be generated requesting the user to indicate whether a particular establishment is still operating (or has closed/gone out of business).

Additionally, in certain implementations the referenced content request can be generated based on a content element determined to be associated with/related to a content element mentioned/referenced by the user (e.g., within the communication received at operation 210). For example, as described above (e.g., with respect to operation 230), a content element mentioned/referenced by a user (e.g., in a first communication) can be stored in a content repository 160 in a manner that reflects various associations, relationships, etc., with other content element(s). Subsequently, response(s) that are generated/provided to the user (e.g., in response to the referenced first communication) can include or incorporate such associated/related content elements. In doing so, communication sequences or conversations between the user and personal assistant 116 can proceed in a manner that is more natural and closer to the manner in which the user might communicate with another human user. Rather than simply repeating or referencing the same content element(s) initially mentioned by the user 130, the described technologies can incorporate other related/associated content element(s) into subsequent communication(s). In doing so, the user can be provided with a more natural/human-like conversational experience when communicating with personal assistant 116. Additionally, the described technologies can more naturally transition a conversation/series of communication(s) from one topic to another. In doing so, the user can be prompted to provide additional information which can be advantageous in any number of scenarios (e.g., to provide updated or missing information).

Figure 6B:
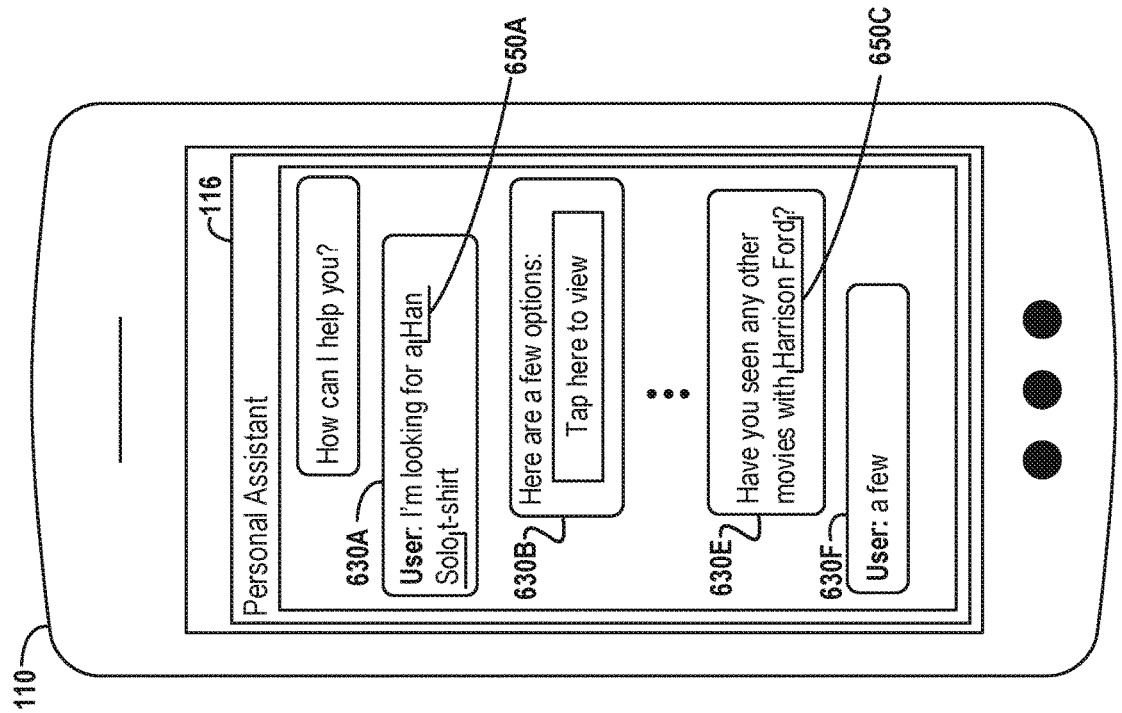
FIGS. 6A and 6B illustrate example scenarios described herein, according to an example embodiment.
Figure 6A:
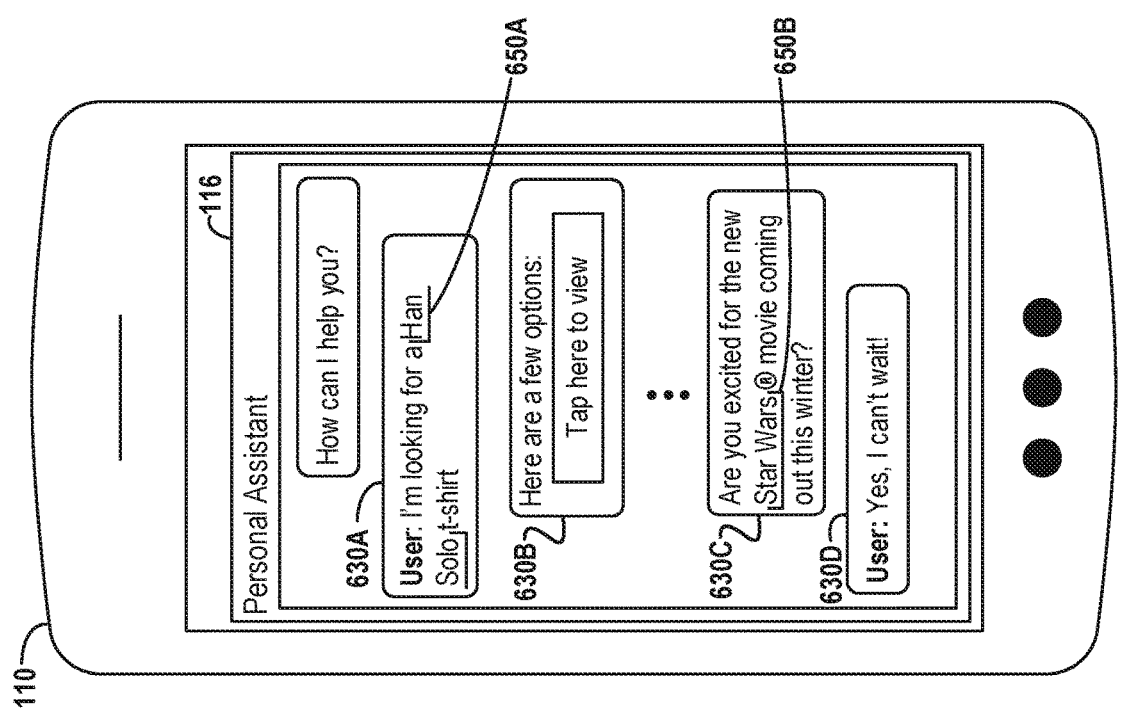

By way of illustration, FIG. 6A depicts an example scenario in which personal assistant 116 is executing on device 110. As shown in FIG. 6A, user 130 can provide/input communication/message 630A ("I'm looking for . . . ") which can be transmitted to/received by server 140 and/or content processing engine 142 (e.g., in conjunction with personal assistant 116 and/or personal assistant engine 144). Communication 630A can then be processed to identify/extract content element(s) such as content element 650A (the entity "Han Solo"). The identified content element can then be stored within content repository 160A (e.g., in a manner that reflects various associations, relationships, with other content element(s), as described above). Subsequently, other communication(s) such as communication 630C ("Are you excited . . . ") can be generated. As shown in FIG. 6A, communication 630C can incorporate/include content element 650B ('Star Wars®'), which corresponds to a content element stored in content repository 160A in relation to content element 650A ('Han Solo,' who is a character in the 'Star Wars®' film series). In doing so, response(s)/subsequent communication(s) generated and provided to user 130 can include/incorporate content elements (e.g., 'Star Wars®') associated with/related to those mentioned/referenced by the user (e.g., 'Han Solo'). By incorporating such related content element(s) into subsequent communications, user 130 can be provided with a more natural/human-like conversational experience. Additionally, incorporating related content element(s) into subsequent communications can facilitate the transition of the conversation from one topic to another (e.g., from a 'Han Solo' t-shirt to the new 'Star Wars®' movie, as shown in FIG. 6A).

By way of further illustration, FIG. 6B depicts another example scenario in which personal assistant 116 is executing on device 110. As noted above, communication 630A (originating from user 130) can be processed to identify/extract content element 650A ('Han Solo'). Subsequently, a response such as communication 630E ("Have you seen . . . ") can be generated. As shown in FIG. 6B, communication 630E can incorporate/include content element 650C ('Harrison Ford'), which corresponds to a content element that may be stored in anther content repository (e.g., a third-party content repository) in relation to content element 650A. For example, a third-party service 128A can maintain a content repository of various actors and films, TV shows, etc., with respect to which such actors are associated. Accordingly, based on a content repository maintained by such a service 128A, other content element(s) associated with content element 650A ('Han Solo') can be identified. For example, content element 650C ('Harrison Ford,' corresponding to the actor that played 'Han Solo' in the 'Star Wars®' films) can be identified and incorporated within communication 630E. In doing so, response(s)/subsequent communication(s) generated and provided to user 130 can include/incorporate content elements (e.g., 'Harrison Ford') associated with/related to those mentioned/referenced by the user (e.g., 'Han Solo'). By incorporating such related content element(s) into subsequent communications, user 130 can be provided with a more natural/human-like conversational experience. Additionally, incorporating related content element(s) into subsequent communications can facilitate the transition of the conversation from one topic to another (e.g., from a 'Han Solo' t-shirt to movies with Harrison Ford, as shown in FIG. 6B).

In certain implementations the referenced content request can be generated based on content element(s) within other content repositorie(s) determined to be associated with/related to a content element mentioned/referenced by the user (e.g., within the communication received at operation 210). For example, as described above, database 170 can maintain multiple content repositories, each of which can correspond to a different user. Accordingly, as shown in FIG. 1, the same content element (e.g., content element 150A) can be associated with different content elements within different content repositories. For example, content element 150A is associated with elements 150B and 150C within content repository 160A, and elements 150D and 150E within repository 160B. Accordingly, content element(s) associated with content element 150A within content repository 160B (e.g., elements 150D and/or 150E) can be used in generating a response/communication with respect to another user that also mentioned/referenced content element 150A. In doing so, subsequent communication(s) provided to the user can incorporate content elements that may be relevant/of interest to the user even in scenarios in which such content elements are not present within a content repository associated with the user.

By way of illustration, FIG. 5B depicts an example scenario in which personal assistant 116 is executing on device 110. As noted above, communication 530A (originating from user 130) can be processed to identify/extract content element 550A ('Yankee Stadium'). Subsequently, a response such as communication 530E ("Hungry for . . . ") can be generated. As shown in FIG. 5B, communication 530E can incorporate/include content element 550F ('slice of pizza'), which corresponds to a content element that may be stored in anther content repository (e.g., content repository 160B, which is associated with another user) in relation to content element 550A ('Yankee Stadium'). For example, a content repository 160B associated with another user can reflect an association/relationship between content element 550A ('Yankee Stadium') and content element 550F ('slice of pizza'). Accordingly, upon receiving communication 530A from user 130 (which incorporates content element 550A), such a content repository 160B (which, as noted, is associated with another user) can be utilized in generating a response. For example, based on a relationship between content elements 550A and 550F ('Yankee Stadium' and 'slice of pizza') within content repository 160B, content element 550F ('slice of pizza') can be incorporated into communication 530E and provided to user 130 based on utilization by user 130 of content element 550A (e.g., within communication 530A). In doing so, response(s)/subsequent communication(s) generated and provided to one user 130 can include/incorporate content elements (e.g., 'slice of pizza') that other user(s) may have utilized in relation to a content element mentioned/referenced by the user (e.g., 'Yankee Stadium'). By leveraging relationships between content elements as reflected in the activity of other user(s), such related content element(s) can be incorporated into subsequent communications directed to user 130. User 130 can thus be provided with a more natural/human-like conversational experience (e.g., by referencing 'slice of pizza' after user 130 mentions 'Yankee Stadium' based on a determination that the activity, communications, etc. of other users reflect a relationship between such content elements).

Moreover, in certain implementations the referenced content request can be generated based on various context indicator(s) (e.g., as received at operation 210). As noted above, such context indicator(s) can be information, metadata, etc., reflecting aspect(s) of the context in which user 130 and/or device 110 is present. Such a context can be, for example, a geographic location at which device 110 is currently present (e.g., as determined via a GPS receiver of the device). By way of illustration, based on a context indicator reflecting a current location of a user 130/device 110 (e.g. that the user is walking past a particular business, location, etc.), a content request pertaining to use a location (e.g. with respect to a nearby business) can be generated or provided.

For example, FIG. 3C depicts an example scenario in which personal assistant 116 is executing on device 110. As shown in FIG. 3C, upon receiving/identifying a context indicator reflecting the geographic location of device 110, a communication/content request can be generated/provided. For example, upon determining (based on the referenced context indicator) that device 110 is near/within a defined proximity of the 'BigCoffeeChain' location on $18^{th}$ Street, a content request (as reflected in communication 330G) can be generated/provided. By generating/providing such content request ("What do you . . . ") based on the referenced context indicator(s), the user can be prompted to provide information within a context (e.g., at a location) that may be relevant or conducive to the user providing the requested content.

Additionally, in certain implementations the referenced content request can be generated based on a lexicon, vernacular, etc. associated with the user (e.g., as identified at operation 220). As noted above, such a lexicon or vernacular can reflect or include various content items, expressions, acronyms, etc., that are used with respect/in relation to one another. For example, as described above, in the scenario depicted in FIG. 5A, communication 530A ("What's the fastest . . . ") received from user 130 can be processed to identify content element 550A (the entity "Yankee Stadium"). Having identified such a content element (here, 'Yankee Stadium'), a content request can be generated/provided to the user based on related/associated content elements included in a lexicon associated with user(s) that discuss and/or are otherwise determined to be interested in 'Yankee Stadium.'

For example, as shown in FIG. 5A, communication 550E ("How do you think . . . ") can reflect a content request which incorporates content element 550E ("the Yanks") included in a lexicon of user(s) who discuss content element 550A ("Yankee Stadium"). By incorporating such content element(s) from the identified lexicon that are likely to be familiar or relevant to the user, the user may be more engaged with the correspondence and may be more likely to provide the requested content.

Figure 3E:
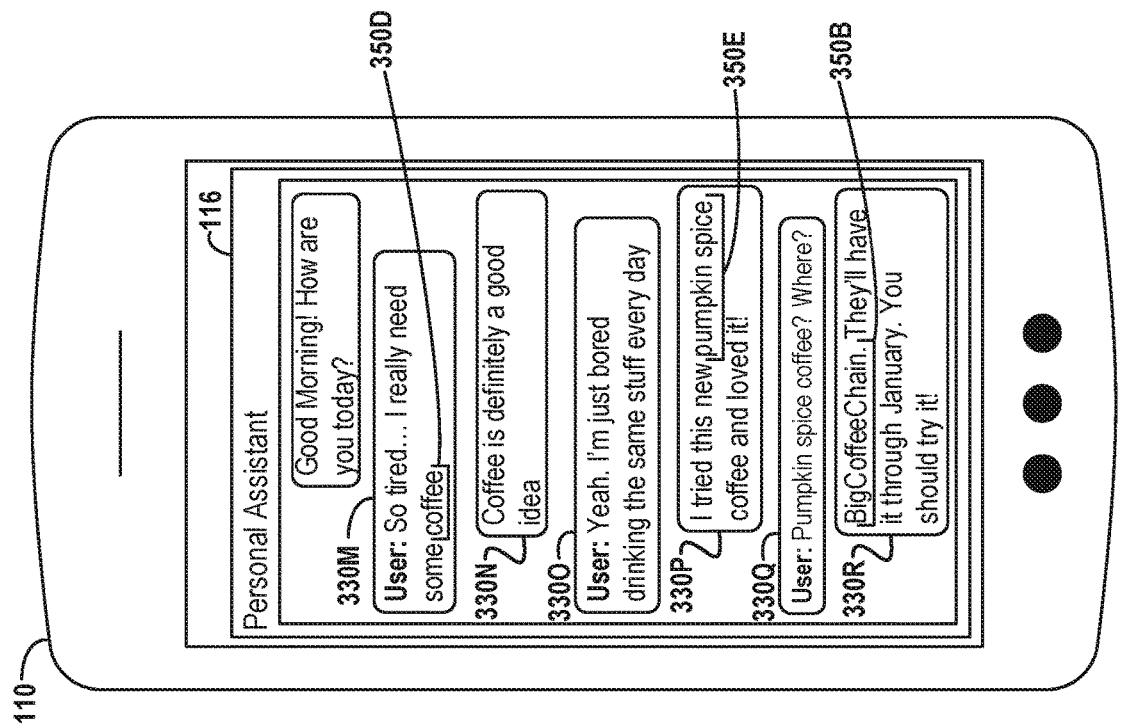

Additionally, in certain implementations the described technologies can generate various content request(s)/communication(s), e.g., in order to direct an ongoing conversation with a user towards certain topic(s). Such communication(s) can be generated based on content element(s) mentioned/referenced by the user (and/or other associated/related content elements). By way of illustration, FIG. 3E depicts an example scenario in which personal assistant 116 is executing on device 110. It should be understood that the depicted communication(s) can be text-based messages, voice audio messages (e.g., to/from a device that receives, processes, and/or provides audio content), visual messages, etc., and/or a combination thereof. As shown in FIG. 3E, communication 330M (originating from user 130) can be processed to identify/extract content element 350D ('coffee'). Subsequently, communications 330P ("I tried . . . ") and 330R ("BigCoffeeChain . . . ") can be generated and provided to the user. As shown in FIG. 3E, such communications can incorporate content elements such as content element 350E ('pumpkin spice') and content element 350B ('BigCoffeeChain'). By incorporating such related content element(s) into subsequent communications, the described technologies can direct a conversation with user 130 from an initial content element ('coffee') to other related content element(s) ('pumpkin spice coffee' and 'BigCoffeeChain') that may be of interest to the user.

At operation 260, a content request (e.g., the content request generated at operation 250) is provided. In certain implementations, such a content request can be provided to a user. Such a user can be the user from which a communication was initially received (e.g., at operation 210). As noted above, the referenced content request can be a communication (e.g., a message) that requests or otherwise prompts a user to provide information, feedback, etc. In certain implementations, the content request can be directed to a user (e.g., user 130) as a communication provided within a messaging/conversational interface (e.g., by personal assistant 116).

As described above, in certain implementations the referenced content request can be generated with respect to a content deficiency. For example, a third-party service 128A that maintains a business directory may lack information regarding the opening time of a particular establishment (e.g., 'BigCoffeeChain' on '$18^{th}$ Street'). Accordingly, in the scenario depicted in FIG. 3A, upon receiving a communication 330A (from user 130) that references 'BigCoffeeChain' (and further determining that the user is currently/has previously been located near 18th Street, as described above), a content request requesting such information can be provided to the user. For example, communications 330C and 330E ("Do you know . . . ") can be provided to user 130 in order to prompt/request the user to provide the missing information (e.g., the opening time). In doing so, the described technologies can utilize a topic being discussed during a communication sequence to elicit content, information, etc. from the user that may be relevant in other contexts.

By way of further illustration, FIG. 3C depicts another scenario in which a content request is provided to a user. As shown in FIG. 3C, upon receiving a communication 330A (from user 130) that references 'BigCoffeeChain' (and further determining that the user is currently/has previously been at the 18th Street location, as described above), a content request requesting feedback can be provided to the user. For example, communication 330G ("What do you . . . ") can be provided to user 130 in order to prompt/request the user to provide feedback regarding the referenced establishment. In doing so, the described technologies can utilize a topic being discussed during a communication sequence to elicit related feedback from the user. By providing the content request in a relevant conversational context, the user may be more inclined to provide such feedback in response. It should also be noted that in other implementations, feedback, opinions, etc. provided by a user (even if not provided in response to a content request) can be processed/utilized in the manner described herein. For example, in a scenario in which user 130 provides communication(s) that reflect feedback about certain entities, topics, etc., such feedback can be stored and utilized (e.g., with respect to subsequent communications) in the manner described herein.

By way of yet further illustration, FIG. 3D depicts a scenario in which a content request is provided to a user. As shown in FIG. 3D, upon receiving a communication 330A (from user 130) that references 'BigCoffeeChain' and 'pumpkin spice,' a content request requesting related feedback can be provided to the user. For example, communication 330K ("Should BigCoffeeChain . . . ") can be provided to user 130 in order to prompt/request the user to provide feedback regarding the referenced topic. Such a content request can originate from/be initiated by a third-party service 128B associated with 'BigCoffeeChain' that wishes to poll or receive feedback from customers. Accordingly, upon determining (based on communication 330A) that such a poll is likely relevant to user 130, the referenced content request 330K can be provided to the user. In doing so, the described technologies can utilize a topic being discussed during a communication sequence to elicit related feedback from the user. By providing the content request in a relevant conversational context, the user may be more inclined to provide such feedback in response.

At operation 270, a second communication is received. In certain implementations, such a second communication can be received from a user (e.g., the user from which a communication was received at operation 210). Moreover, in certain implementations such a communication can be received in response to a content request (e.g., the content request generated at operation 250 and/or provided at operation 260).

In certain implementations, the referenced second communication (as well as the other communications described herein) can be received in any number of forms, formats, types, etc. Examples of such communications include but are not limited to: text input(s), audio input(s), visual input(s), or biometric input(s). By way of illustration, user 130 can provide the referenced communication(s) by typing text, providing voice inputs (e.g., via a microphone of device 110), or providing visual input(s) (e.g., facial expressions, gestures, etc.) as captured by a camera/image sensor of device 110.

Figure 4B:
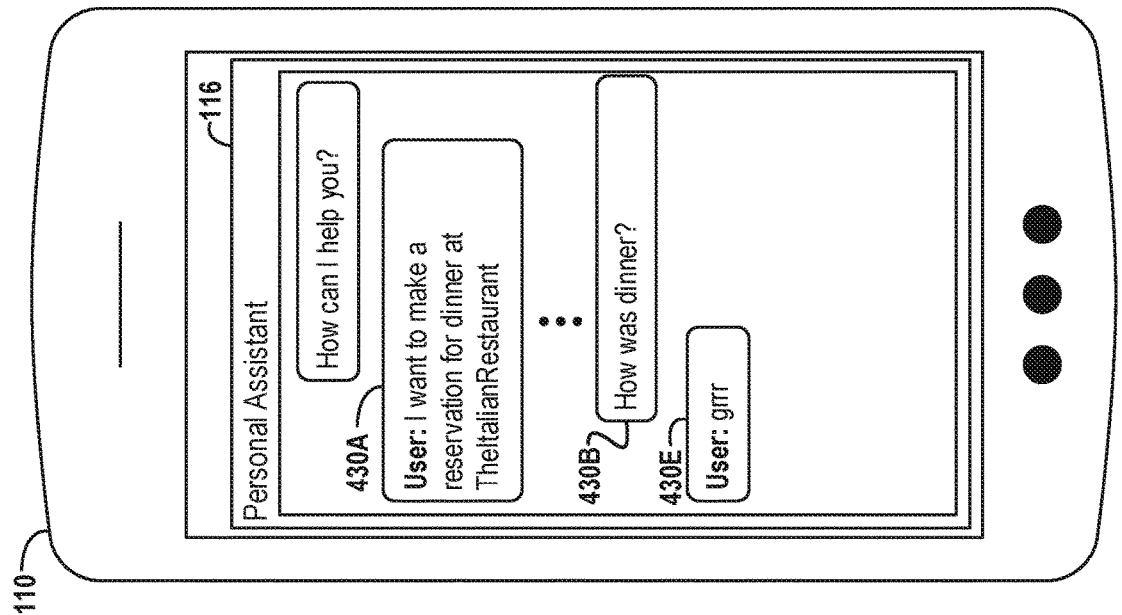
FIGS. 4A and 4B illustrate example scenarios described herein, according to an example embodiment.
Figure 4A:
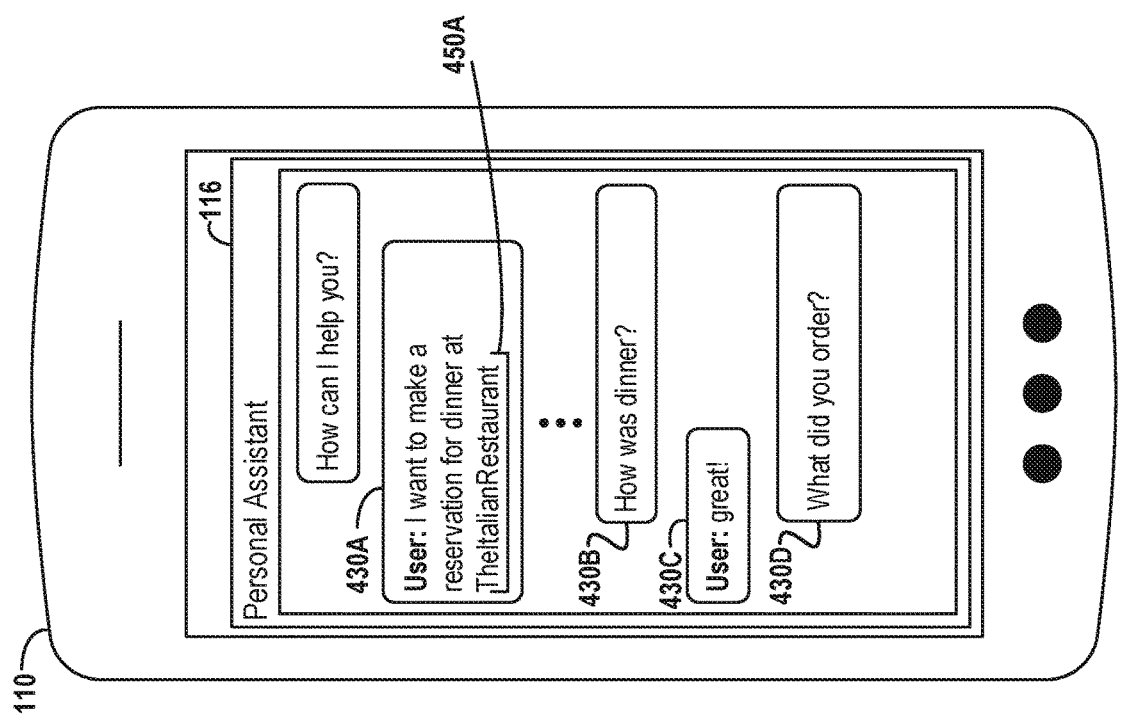

By way of illustration, FIG. 4A depicts a scenario in which user 130 provides such a second communication 430C ("great!") in response to a content request 430B ("How was dinner?"). Such a communication 430C can be received via text input from the user, or received as a voice input (and transcribed using voice processing techniques). By way of further illustration, FIG. 4B depicts a related scenario in which user 130 provides second communication 430E ("grrr") in response to content request 430B.

It should be noted with respect to the scenario depicted in FIG. 4A, that various aspects of the depicted communication session (e.g., content element 450A, the date that the user visited the restaurant, etc.) can be stored in database 170 (and/or in a profile associated with user 130). Subsequent communication(s) provided to user 130 regarding the referenced restaurant/visit (e.g., communication 430B or a variation thereof, e.g., 'How was dinner at TheItalianRestaurant?') can be initiated at a later time (e.g., one day, week, etc., later). For example, the next time the user mentions going out to dinner within personal assistant 116, the user can be prompted with a content request such as communication 430B (requesting feedback regarding a previous establishment the user vi sited for dinner).

At operation 280, the second communication (e.g., as received at operation 270) is processed. In doing so, a sentiment of the user can be determined. The referenced sentiment can be a score or metric that reflects various aspects of the mood of a user. For example, various sentiment analysis/emotion detection techniques can be applied to the communication(s) (text, audio, biometric, etc.) received from user 130. The sentiment, emotion, etc., identified via such techniques can provide further insight and/or feedback with respect to the opinion or feelings of a user with respect to the topic/item being discussed. For example, inputs provided by a user during a conversation that reflect enthusiasm (as deter mined based on the tone of voice of the user) can indicate that the user is excited about the topic of the conversation. Having identified such enthusiasm, the user can, for example, be prompted to provide additional feedback regarding the same topic. By way of further example, inputs reflecting disinterest (as determined based on facial expression(s) of the user, e.g., the user rolling his/her eyes) can indicate that the user is not interested in the topic of the conversation. Having identified such disinterest, the described technologies may suppress or preclude subsequent communications regarding the same topic.

By way of illustration, FIG. 4A depicts a scenario in which user 130 provides communication 430C ("great!") in response to a content request 4309 ("How was dinner?"). Such a communication 430C (which can be a voice input) can be processed (e.g., using sentiment analysis techniques) to determine that user 130 responded enthusiastically. Having identified such enthusiasm, communication 430D ("What did . . . ") can be generated/provided to the user, in order to follow-up on or otherwise continue the conversation regarding a topic the user is determined to be enthusiastic about. By way of further illustration, in a comparable scenario depicted in FIG. 4B, user 130 responds to content request 4309 with communication 430E ("grrr"). Upon determining that such a response ("grrr") reflects disappointment or anger, the described technologies can be configured not to provide further communications regarding the referenced topic. In doing so, the user can continue to be engaged in conversation regarding topics that are likely to be of interest while not being engaged regarding topics that the user may not wish to discuss.

At operation 290, an action is initiated. In certain implementations, such an action can be initiated based on/in response to a communication (e.g., the communication received at operation 270). Such an action can include but is not limited to: generating/providing additional communication(s) (e.g., within the referenced communication session), generating/providing various notifications, generating various content entries, etc., as described herein.

In certain implementations, the referenced action can be initiated based on a context identified with respect to the user. For example, FIG. 3B depicts an example scenario in which user 130 references various content elements (e.g., 'pumpkin spice' and 'BigCoffeeChain') within communication 330A. Subsequently upon determining (e.g., based on the geographic location of device 110, as described above) that device 110 is near/within a defined proximity of the 'BigCoffeeChain' location on $18^{th}$ Street, a promotional communication 330F ("You're approaching . . . ") can be generated/provided to user 130. Such a communication 330F can notify the user that they are near an establishment that the user previously inquired about ('BigCoffeeChain'), and can further incorporate a promotional code, coupon, selectable control, etc. ("Tap here . . . "). Additionally, the communication can be further customized to incorporate content elements previously referenced by the user (e.g., 'pumpkin spice'). In doing so, content previously referenced by a user can be utilized in providing communications that are relevant to a current context (e.g., location) associated with the user.

By way of further illustration, in certain implementations communication(s) provided by a user can be utilized to generate various content entries. For example, as shown in FIG. 3C, user 130 can provide communication 330H ("I love . . . ") in response to content request 330G ("What do . . . "). Communication 330H can reflect feedback regarding the 'BigCoffeeChain' location on $18^{th}$ Street. Accordingly, having received such feedback, the described technologies can further request permission or approval from user 130 to utilize or incorporate communication 330H into a review or entry (e.g., on a website/directory that maintains ratings/feedback regarding various establishments). Upon receiving such approval from user 130, communication 330H can be utilized in generating a review entry for the 'BigCoffeeChain' location on $18^{th}$ Street, and such entry can be posted or published on the relevant site(s), page(s), etc. In doing so, the described technologies can elicit feedback from users within the context of an ongoing conversation and then generate content entries (which can be reviewed by other users) based on such feedback.

It should also be noted that while the technologies described herein are illustrated primarily with respect to conversationally-relevant content requests, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-6B are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 7 is a block diagram illustrating components of a machine 700, according to some example implementations, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. The instructions 716 transform the general, non-programmed machine into a particular machine programmed to carry out the described and illustrated functions in the manner described. In alternative implementations, the machine 700 operates as a standalone device or can be coupled (e.g., networked) to other machines. In a networked deployment, the machine 700 can operate in the capacity of a server machine or a client machine in a server-client network environment, or as a peer machine in a peer-to-peer (or distributed) network environment. The machine 700 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 can include processors 710, memory/storage 730, and I/O components 750, which can be configured to communicate with each other such as via a bus 702. In an example implementation, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 712 and a processor 714 that can execute the instructions 716. The term "processor" is intended to include multi-core processors that can comprise two or more independent processors (sometimes referred to as "cores") that can execute instructions contemporaneously. Although FIG. 7 shows multiple processors 710, the machine 700 can include a single processor with a single core, a single processor with multiple cores (e.g., a multi-core processor), multiple processors with a single core, multiple processors with multiples cores, or any combination thereof.

The memory/storage 730 can include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 can also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 can include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 can include many other components that are not shown in FIG. 7. The I/O components 750 are grouped according to functionality merely for simplifying the following discussion and the grouping is in no way limiting. In various example implementations, the I/O components 750 can include output components 752 and input components 754. The output components 752 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 750 can include biometric components 756, motion components 758, environmental components 760, or position components 762, among a wide array of other components. For example, the biometric components 756 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 can include acceleration sensor components (e.g., accelerometer), gravitation sensor components, rotation sensor components (e.g., gyroscope), and so forth. The environmental components 760 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 762 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 750 can include communication components 764 operable to couple the machine 700 to a network 780 or devices 770 via a coupling 782 and a coupling 772, respectively. For example, the communication components 764 can include a network interface component or other suitable device to interface with the network 780. In further examples, the communication components 764 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 can be another machine or any of a wide variety of peripheral devices (e.g., a peripheral device coupled via a USB).

Moreover, the communication components 764 can detect identifiers or include components operable to detect identifiers. For example, the communication components 764 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 764, such as location via Internet Protocol (IP) geolocation, location via Wi-Fi® signal triangulation, location via detecting an NFC beacon signal that can indicate a particular location, and so forth.

In various example implementations, one or more portions of the network 780 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 can include a wireless or cellular network and the coupling 782 can be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 can be transmitted or received over the network 780 using a transmission medium via a network interface device (e.g., a network interface component included in the communication components 764) and utilizing any one of a number of well-known transfer protocols (e.g., HTTP). Similarly, the instructions 716 can be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
   a processing device; and
   a memory coupled to the processing device and storing instructions that, when executed by the processing device, cause the system to perform operations comprising:
   processing a first communication to identify a first content element within the first communication;
   storing the first content element within a first content repository;
   creating a relationship between the first content element included in the first content repository and a second content element included in a second content repository, wherein the relationship includes an indication of an action completed by other users that includes the second content element;
   identifying the second content element in a current context of a user;
   determining a content deficiency in the first content repository based on the current context and the relationship between the first content element and the second content element;
   generating a content request based on the first content repository and the content deficiency, wherein the content request includes a request for a third content item identified based on the current context;
   providing the content request to the user;
   receiving a second communication from the user in response to the content request, wherein the second communication includes the third content item; and
   initiating the action based on the second communication, wherein the action is initiated in part based on receipt of the third content item and the current context of the user.

2. The system of claim 1, wherein processing the first communication comprises identifying a vernacular associated with the user.

3. The system of claim 2, wherein generating the content request comprises generating the content request based on the vernacular associated with the user.

4. The system of claim 1, wherein generating a content request comprises identifying a content deficiency within the first content repository.

5. The system of claim 1, wherein receiving the first communication comprises receiving a context indicator associated with the user and wherein generating the content request comprises generating the content request based on a context indicator.

6. The system of claim 1, wherein generating the content request comprises generating the content request based on the second content repository that contains the first content element.

7. The system of claim 6, wherein the second content repository is associated with a second user.

8. The system of claim 1, wherein storing the first content element comprises associating the first content element with the second content element within the first content repository.

9. The system of claim 8, wherein generating the content request comprises generating the content request based on the second content element.

10. The system of claim 1, wherein the memory further stores instructions for causing the system to perform operations comprising receiving a content deficiency notification from a service.

11. The system of claim 10, wherein generating the content request comprises generating the content request based on the content deficiency notification.

12. The system of claim 1, wherein the memory further stores instructions for causing the system to perform operations comprising processing the second communication to determine a sentiment of the user.

13. The system of claim 12, wherein the second communication comprises at least one of: a text input, an audio input, a visual input, or a biometric input.

14. The system of claim 1, wherein initiating an action comprises initiating the action based on a context identified with respect to the user.

15. The system of claim 1, wherein initiating the action comprises generating a content entry based on the second communication.

16. A method comprising:
receiving a first communication from a user;
processing the first communication to identify a first content element within the first communication;
associating the first content element within a first content repository with a second content element included in a second content repository, wherein the association includes an indication of an action completed by other users that includes the second content element;
identifying the second content element in a current context of the user;
determining a content deficiency in the first content repository based on the current context and the association between the first content element and the second content element;
generating a content request based on the second content element and the content deficiency, wherein the content request includes a request for a third content item identified based on the current context;
providing the content request to the user;
receiving a second communication from the user in response to the content request, wherein the second communication includes the third content item; and
initiating the action based on the second communication, wherein the action is initiated in part based on receipt of the third content item and the current context of the user.

17. The method of claim 16, further comprising receiving a content deficiency notification from a service, wherein generating the content request comprises generating the content request based on the content deficiency notification.

18. A non-transitory computer readable medium having instructions stored thereon that, when executed by a processing device, cause the processing device to perform operations comprising:
receiving a first communication from a user;
processing the first communication to identify a first content element within the first communication;
storing the first content element within a first content repository;
associating the first content element within the first content repository with a second content element included in a second content repository, wherein the association includes an indication of an action completed by other users that includes the second content element;
identifying the second content element in a current context of the user;
determining a content deficiency in the first content repository based on the current context and the association between the first content element and the second content element;
generating a content request based on the second content repository that contains the first content element and the content deficiency, wherein the content request includes a request for a third content item identified based on the current context;
providing the content request to the user;
receiving a second communication from the user in response to the content request, wherein the second communication includes the third content item; and
initiating the action based on the second communication, wherein the action is initiated in part based on receipt of the third content item and the current context of the user.

19. The computer-readable medium of claim 18, wherein the medium further stores instructions for causing the processing device to perform operations comprising processing the second communication to determine a sentiment of the user.

20. The computer-readable medium of claim 19, wherein initiating the action comprises initiating the action based on the sentiment of the user.

* * * * *